(12) United States Patent
Callender et al.

(10) Patent No.: US 12,068,879 B2
(45) Date of Patent: Aug. 20, 2024

(54) SMART DEVICE PROVISIONING

(71) Applicant: T-Mobile Innovations LLC, Overland Park, KS (US)

(72) Inventors: Christopher Callender, Overland Park, KS (US); Brian Kuntz, Paola, KS (US); Lyle W. Paczkowski, Mission Hills, KS (US); Michael D. Svoren, Jr., Overland Park, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

(21) Appl. No.: 18/172,958

(22) Filed: Feb. 22, 2023

(65) Prior Publication Data

US 2023/0208669 A1 Jun. 29, 2023

Related U.S. Application Data

(62) Division of application No. 17/089,647, filed on Nov. 4, 2020, now Pat. No. 11,627,011.

(51) Int. Cl.
| | | |
|---|---|---|
| *H04L 12/28* | (2006.01) | |
| *G05B 19/042* | (2006.01) | |
| *G06F 16/903* | (2019.01) | |
| *G06N 5/02* | (2023.01) | |
| *H04L 67/53* | (2022.01) | |

(52) U.S. Cl.
CPC ........ *H04L 12/2816* (2013.01); *G05B 19/042* (2013.01); *G06F 16/90335* (2019.01); *G06N 5/02* (2013.01); *H04L 12/2809* (2013.01); *H04L 12/281* (2013.01); *H04L 67/53* (2022.05); *G05B 2219/2642* (2013.01)

(58) Field of Classification Search
CPC .......... G05B 19/042; G05B 2219/2642; G06F 16/90335; G06N 5/02; H04L 12/2809; H04L 12/281; H04L 12/2816; H04L 67/53
USPC ......................................................... 709/223
See application file for complete search history.

(56) References Cited

U.S. PATENT DOCUMENTS

| | | |
|---|---|---|
| 9,572,184 B1 | 2/2017 | Erdogan |
| 9,706,380 B1 * | 7/2017 | Murchison ............ H04W 4/021 |
| 9,900,171 B2 | 2/2018 | Guedalia et al. |

(Continued)

FOREIGN PATENT DOCUMENTS

| | | | |
|---|---|---|---|
| EP | 4193629 | 6/2023 | |
| JP | 2021528028 A * | 6/2019 | ............... G07C 9/21 |

(Continued)

OTHER PUBLICATIONS

English translation of JP-2021528028-A provided by Clarivate Analytics (pp. 1-35). (Year: 2019).*

(Continued)

*Primary Examiner* — David P Zarka

(57) ABSTRACT

Aspects of the disclosure provide for a method implemented by a computing device executing an artificial intelligence electronic assistant application. In some examples, the method includes searching a local area network for smart home devices to determine an identifier associated with a smart home device, provisioning the smart home device to an ecosystem of devices that is managed by the computing device, and automatically arbitrating communication of the smart home device based on the provisioning.

18 Claims, 9 Drawing Sheets

(56) References Cited

U.S. PATENT DOCUMENTS

| | | |
|---|---|---|
| 10,142,122 B1 | 11/2018 | Hill et al. |
| 10,212,207 B2 | 2/2019 | Albisu |
| 10,223,751 B1 | 3/2019 | Hutchinson et al. |
| 10,397,013 B1* | 8/2019 | Hill .................. H04L 12/281 |
| 10,498,598 B1 | 12/2019 | Sanchez et al. |
| 10,531,360 B1 | 1/2020 | Govindassamy |
| 10,685,669 B1 | 6/2020 | Lan et al. |
| 10,713,007 B2 | 7/2020 | Aiken et al. |
| 10,958,567 B1 | 3/2021 | Tsai et al. |
| 11,256,828 B1 | 2/2022 | Machado et al. |
| 11,258,671 B1 | 2/2022 | Vora et al. |
| 11,374,781 B1 | 6/2022 | Callender et al. |
| 11,627,011 B1* | 4/2023 | Callender ......... G06F 16/90335 709/223 |
| 11,676,591 B1 | 6/2023 | Callender et al. |
| 2002/0181676 A1 | 12/2002 | Noblot |
| 2010/0278127 A1 | 11/2010 | Jeon et al. |
| 2014/0176310 A1* | 6/2014 | Kotlicki ................. G08C 17/02 340/12.5 |
| 2014/0244834 A1 | 8/2014 | Guedalia et al. |
| 2014/0355566 A1 | 12/2014 | Walley et al. |
| 2015/0088518 A1 | 3/2015 | Kim et al. |
| 2015/0139120 A1 | 5/2015 | ElArabawy et al. |
| 2015/0237650 A1 | 8/2015 | Auvray |
| 2016/0050589 A1 | 2/2016 | Safavi |
| 2016/0212099 A1 | 7/2016 | Zou et al. |
| 2016/0217785 A1 | 7/2016 | Kennewick et al. |
| 2016/0277435 A1 | 9/2016 | Salajegheh et al. |
| 2016/0359913 A1* | 12/2016 | Gupta ................... H04L 9/0866 |
| 2017/0063823 A1 | 3/2017 | Cheng et al. |
| 2017/0063940 A1 | 3/2017 | Lapidous et al. |
| 2017/0142233 A1 | 5/2017 | Boucadair et al. |
| 2017/0156038 A1* | 6/2017 | Chen .................. H04L 67/1044 |
| 2017/0185757 A1 | 6/2017 | Yang et al. |
| 2017/0187820 A1 | 6/2017 | Vangala et al. |
| 2017/0195318 A1 | 7/2017 | Liu et al. |
| 2017/0230832 A1* | 8/2017 | Ophir ..................... H04W 12/06 |
| 2018/0075262 A1 | 3/2018 | Auh |
| 2018/0077067 A1 | 3/2018 | Dowlatkhah et al. |
| 2018/0089455 A1* | 3/2018 | Castinado ............. H04W 12/08 |
| 2018/0116004 A1 | 4/2018 | Britt et al. |
| 2018/0279389 A1 | 9/2018 | Kwag et al. |
| 2018/0337958 A1 | 11/2018 | Nagarkar |
| 2019/0014048 A1 | 1/2019 | Krishna Singuru |
| 2019/0028338 A1 | 1/2019 | Kozura et al. |
| 2019/0052630 A1 | 2/2019 | Lapidous et al. |
| 2019/0052683 A1 | 2/2019 | Logue et al. |
| 2019/0223180 A1 | 7/2019 | Fehrenbach et al. |
| 2019/0253243 A1 | 8/2019 | Zimmerman et al. |
| 2019/0254043 A1 | 8/2019 | Makki et al. |
| 2019/0261243 A1 | 8/2019 | Amini et al. |
| 2019/0279627 A1 | 9/2019 | Wang et al. |
| 2019/0287168 A1* | 9/2019 | Williams, III ....... G06F 16/2457 |
| 2019/0333059 A1 | 10/2019 | Fallah et al. |
| 2019/0356556 A1 | 11/2019 | Vicat-Blanc |
| 2020/0112454 A1 | 4/2020 | Brown et al. |
| 2020/0142365 A1* | 5/2020 | Sharma ..................... G06N 5/01 |
| 2020/0162287 A1* | 5/2020 | Wang .................. H04L 61/5014 |
| 2020/0177449 A1 | 6/2020 | Dakshinyam et al. |
| 2020/0177517 A1 | 6/2020 | Pancras et al. |
| 2020/0259658 A1* | 8/2020 | Libsch ................... H04L 9/3234 |
| 2020/0280827 A1 | 9/2020 | Fechtel et al. |
| 2020/0314247 A1 | 10/2020 | Klinger et al. |
| 2020/0394183 A1 | 12/2020 | Jois |
| 2020/0412810 A1 | 12/2020 | Knight et al. |
| 2021/0049599 A1 | 2/2021 | Ghafourifar et al. |
| 2021/0056141 A1* | 2/2021 | Wojcik ................ H04L 12/4625 |
| 2021/0203521 A1* | 7/2021 | Konda ................ H04L 63/1425 |
| 2021/0320794 A1 | 10/2021 | Auh et al. |
| 2021/0350642 A1* | 11/2021 | Schneider ................. G07C 9/38 |
| 2021/0400767 A1 | 12/2021 | Zubiaur et al. |
| 2022/0094560 A1* | 3/2022 | Gaur ..................... H04L 9/3247 |
| 2022/0141025 A1* | 5/2022 | Bogineni ............. H04L 9/3236 713/156 |
| 2022/0141221 A1 | 5/2022 | Callender et al. |

FOREIGN PATENT DOCUMENTS

| | | |
|---|---|---|
| TW | 202141317 A | 4/2020 |
| WO | 20180231197 A1 | 12/2018 |
| WO | 2022098423 A1 | 5/2022 |

OTHER PUBLICATIONS

Merriam-Webster's Collegiate Dictionary 252 (v. def. 2a) (10th ed. 1993) (Year: 1993).*

PC Mag, "computing device," p. 1, available at https://www.pcmag.com/encyclopedia/term/computing-device (Year: 2024).*

Office Action dated Jul. 21, 2023, U.S. Appl. No. 17/090,763, filed Nov. 5, 2020.

"Restriction Requirement dated Jan. 13, 2022, U.S. Appl. No. 17/089,647, filed Nov. 4, 2020."

FAIPP Pre-Interview Communication dated Mar. 25, 2022, U.S. Appl. No. 17/089,647, filed Nov. 4, 2020.

FAIPP Office Action dated Jun. 2, 2022, U.S. Appl. No. 17/089,647, filed Nov. 4, 2020.

Notice of Allowance dated Dec. 7, 2022, U.S. Appl. No. 17/089,647, filed Nov. 4, 2020.

Office Action dated Sep. 3, 2021 U.S. Appl. No. 17/107,590, U.S. Appl. No. 17/107,590.

Final Office Action dated Dec. 8, 2021, U.S. Appl. No. 17/107,590, filed Nov. 30, 2020.

Notice of Allowance dated Mar. 2, 2022, U.S. Appl. No. 17/107,590, filed Nov. 30, 2020.

Office Action dated Sep. 19, 2022, U.S. Appl. No. 17/100,681, filed Nov. 20, 2020.

Notice of Allowance dated Feb. 10, 2023, U.S. Appl. No. 17/100,681, filed Nov. 20, 2020.

"Restriction Requirement dated Aug. 13, 2022, U.S. Appl. No. 17/090,763, filed Nov. 5, 2020."

FAIPP Pre-Interview Communication dated Sep. 29, 2022, U.S. Appl. No. 17/090,763, filed Nov. 5, 2020.

FAIPP Office Action dated Oct. 3, 2022, U.S. Appl. No. 17/090,763, filed Nov. 5, 2020.

Final Office Action dated Jan. 11, 2023, U.S. Appl. No. 17/090,763, filed Nov. 5, 2020.

Advisory Action dated Feb. 24, 2023, U.S. Appl. No. 17/090,763, filed Nov. 5, 2020.

Foreign Communication From a Related Counterpart Application, Invitiation to Pay Additional Fees dated Dec. 7, 2021, International Application No. PCT/US2021/048704 filed on Sep. 1, 2021.

Foreign Communication From a Related Counterpart Application, International Search Report and Written Opinion dated Jan. 25, 2022, International Application No. PCT/US2021/048704 filed on Sep. 1, 2021.

Al-Zihad, et al., "Bandwidth Allocation and Computation Offloading for Service Specific IoT Edge Devices", Region 10 Humanitarian Technology Conference (R10-HTC), Dec. 21, 2017.

Samie, et al., "Computation Offloading and Resource Allocation for Low-power IoT Edge Devices", 3rd World Forum on an Internet of Things, Dec. 2016, IEEE Publishing.

Marion, et al: "Virtualization of Home Network Gateways", Computer, IEEE, USA, vo. 47, No. 11, pp. 62-65, XP011564866, Nov. 1, 2014.

Callender, Christopher, et al., "Smart Computing Device Implementing Artificial Intelligence Electronic Assistant," filed Nov. 20, 2020, U.S. Appl. No. 17/100,681.

Callender, Christopher, et al., "Smart Computing Device Implementing Network Security and Data Arbitration," filed Nov. 5, 2020, U.S. Appl. No. 17/090,763.

Callender, Christopher, et al., "Smart Computing Device Implementing Network Security and Data Arbitration," filed Sep. 1, 2021 International Application No. PCT/US2021/048704.

Final Office Action dated Sep. 26, 2023, U.S. Appl. No. 17/090,763, filed Nov. 5, 2020.

(56) References Cited

OTHER PUBLICATIONS

Callender, Christopher, et al., "Smart Computing Device Implementing Network Security and Data Arbitration," filed Dec. 22, 2023, U.S. Appl. No. 18/395,216.

* cited by examiner

SMART DEVICE PROVISIONING

CROSS-REFERENCE TO RELATED APPLICATIONS

This application is a divisional of and claims priority under 35 U.S.C. § 120 to U.S. patent application Ser. No. 17/089,647, filed on Nov. 4, 2020, entitled "Smart Device Provisioning," by Christopher Callender, et al., which is incorporated herein by reference in its entirety for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In a location that includes multiple smart appliances, or appliances that include Internet connectivity, security concerns can arise. The security concerns can result from numerous incoming and outgoing data connections through a network existing at the location, terminating at, or being initiated by, the smart appliances.

SUMMARY

Aspects of the disclosure provide for a method implemented by a computing device in a network. In some examples, the method includes searching a local area network for smart home devices to determine an identifier associated with a smart home device, searching a database for instructions related to the smart home device based on the determined identifier of the smart home device, generating a smart contract with the smart home device based at least partially on the instructions related to the smart home device, writing the identifier associated with the smart home device to a second database, generating a digital twin of the smart home device, and automatically arbitrating, by the computing device, communication of the smart home device based on the smart contract.

Other aspects of the disclosure provide for a computing device. In some examples, the computing device includes a processor, a non-transitory memory coupled to the processor, and an artificial intelligence electronic assistant application stored in the non-transitory memory. When the instructions are executed by the processor, the processor searches a local area network for smart home devices to determine an identifier associated with a smart home device, provisions the smart home device to an ecosystem of devices that is managed by the computing device, and automatically arbitrates communication of the smart home device based on the provisioning.

Other aspects of the disclosure provide for a method implemented by a computing device executing an artificial intelligence electronic assistant application. In some examples, the method includes searching a local area network for smart home devices to determine an identifier associated with a smart home device, provisioning the smart home device to an ecosystem of devices that is managed by the computing device, and automatically arbitrating communication of the smart home device based on the provisioning.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
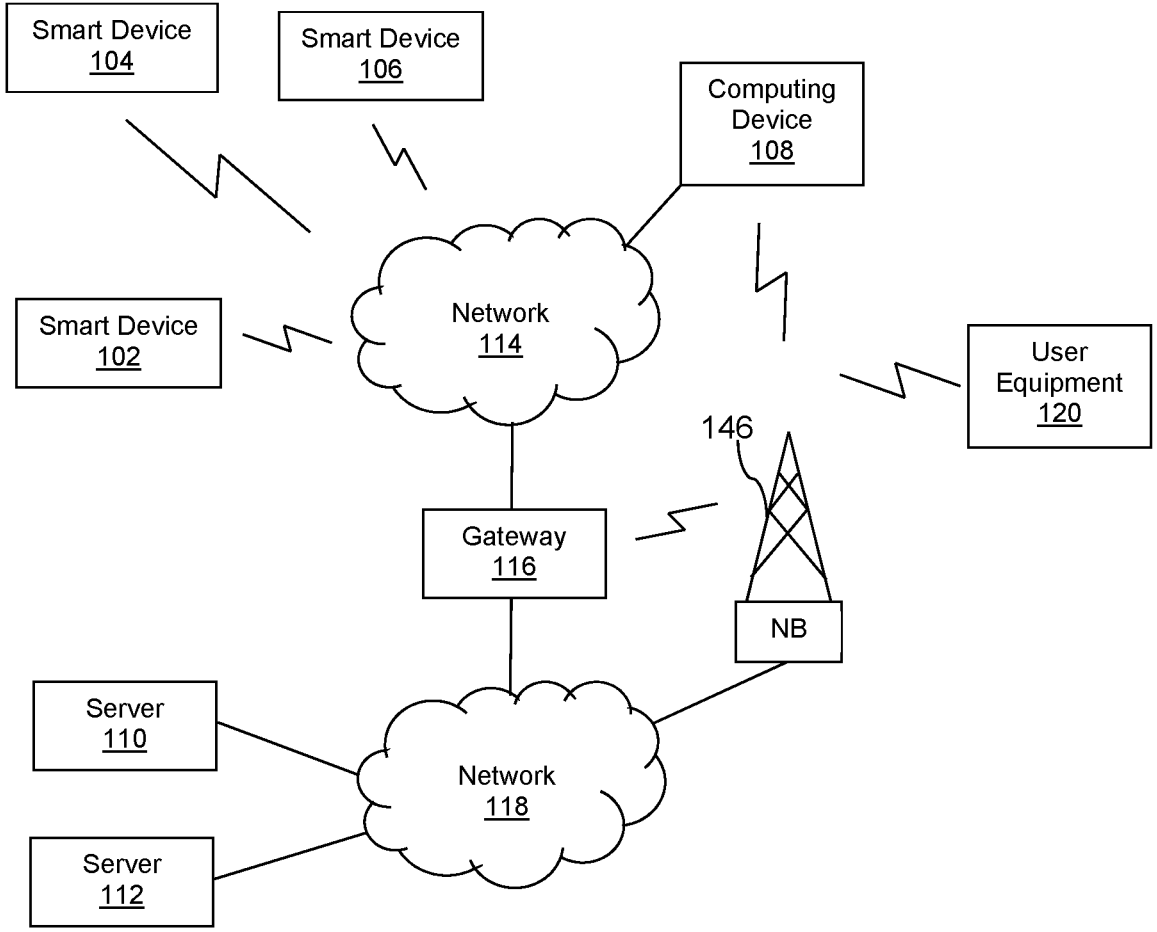
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Smart home devices continue to become more prevalent and ingrained in the daily lives of users. As used herein, a smart home device is a device that provides functionality to a user that is facilitated by, or augmented by, Internet or other network connectivity. At least some smart home devices may also be referred to as Internet of Things (I) devices. Additionally, while the smart home devices are discussed herein with reference to a home, they are equally applicable to, and may be implemented in, other locations such as office buildings, vehicles, etc., and the considerations and teachings of this disclosure apply to all such locations or environments. A non-exhaustive list of example smart home devices includes a network-enabled television, a network-enabled heating, ventilation or air conditioning (HVAC) controller, a network-enabled power supply or switch (e.g., light switch, fan switch, etc.), a network-enabled refrigerator or other kitchen appliance, a network-enabled garage door or garage door opener, network-enabled occupancy sensors, a network-enabled electronic assistant, etc.

To provide at least a portion of their intended functionality, these smart home devices may be a termination point for data connections passing through a network of the home or the point of initiation for data connections passing through a network of the home. However, a user of those smart home devices may wish to enhance security, or functionality, associated with use of the smart home devices. One way of performing such an enhancement is registering the smart home devices with a system that interfaces between the smart home devices and an external network and/or manages at least some functions or operations of the smart home devices. Conventional network implementations, or smart home device deployment schemes, may present challenges to the implementation of such a system.

Aspects of the present disclosure provide for a system that interfaces between smart home devices and an external network. The system is, in some examples, a security device or a device that provides, implements, or performs at least some network security functions. In some examples, the system includes further functionality such as being a network gateway device, a mobile hotspot, an electronic assistant, etc. For each smart home device registered with the system, the system operates as a conduit or gatekeeper for data transfer and connections between the smart home device and devices, persons, or entities outside the home network. In some examples, for at least some of the smart home devices registered with the system, the system operates as a conduit or gatekeeper for data transfer and connections among the smart home devices within the home network.

The system is implemented, in some examples, by provisioning a computing device as a controller of the system. The computing device may be any device having network communication and processing capacity. However, in at least some examples computing devices having increased capacity (e.g., a greater amount of network bandwidth, a greater amount of processing capacity, etc.) may provide an increased amount of functionality in the system. For example, provisioning a server device as the controller may provide for an increased amount of functionality in the system as compared to provisioning a computing device embedded in an IoT refrigerator as the controller. To provision the computing device, in at least some implementations, executable code may be provided to and executed on the computing device. The executable code may be considered a seed that provisions the computing device and provides basic functionality for discovering smart home devices communicatively coupled to the computing device.

Based on the discovered smart home devices, the computing device may retrieve and execute additional executable code related to those detected smart home devices. In some implementations, the additional executable code may be obtained based on a hyperledger (e.g., a block chain and/or distributed ledger). For example, a smart home device may be associated with an identifier. Based on that identifier, the computing device may discover a relevant portion of a hyperledger that includes, or includes a reference to, an application programming interface (API) for interacting with the smart home device. The computing device may discover the relevant portion of the hyperledger by searching a local copy of the hyperledger or a remote copy of the hyperledger (e.g., such as a copy of the hyperledger stored in a near-cloud data base). Based on that API, the computing device may interact with the smart home device to execute at least some level of control and/or management of the smart home device.

To discover the smart home devices the computing device searches for the smart home devices in the environment in which the computing device is discovered. For example, these may be smart home devices radiating a wireless signal receivable and within range of the computing device, smart home devices communicatively coupled to a local area network (LAN) to which the computing device is coupled, etc. In some examples, the computing device may automatically add at least some of the discovered smart home devices to an ecosystem managed by the computing device after it initiates communication with the smart home devices. As used herein, the ecosystem managed by the computing device may refer to a grouping of devices over which the computing device exerts some level of control or management, whether partial or full. At least some of the devices in the ecosystem may have interoperability, in full or in part, with each other. In other examples, the computing device presents the discovered smart home devices to a user for selection for addition to the ecosystem managed by the computing device. Such a presentation may be via a graphical user interface hosted and/or presented by the computing device, such as on a monitor of or coupled to the computing device. Such a presentation may also, or alternatively, be via a graphical user interface of a smartphone, tablet, or other handheld device that is communicatively coupled with the computing device and which operates in concert with the computing device. For example, the computing device may communicate with an application executing on a handset device via one or more APIs of the application. Via the APIs and the application, a user may provide input selecting, or not selecting, various of the discovered smart home devices for addition to the ecosystem managed by the computing device. The addition of the smart home devices to the ecosystem managed by the computing device, in some examples, is referred to as provisioning the smart home devices to the ecosystem.

In other examples, smart home devices may be added to the ecosystem managed by the computing device without those smart home devices being in communication with the computing device. For example, the application executing on the handset device described above may include a point-and-shoot or scan functionality for provisioning smart home devices to the ecosystem managed by the computing device. The application may be a trustlet, or include other trust domain functionality, such that the computing device has confidence in trustworthiness of the application and of smart home devices provisioned to the environment by the application. In some examples, the application may scan a Quick Response (QR) code, barcode (e.g., such as Universal Product Code (UPC)), serial number, or other visual indicator associated with a smart home device. In other examples, the application may scan a tag or other electronic device, such as a Near Field Communication (NFC) tag, a Bluetooth beacon or tag, a radio frequency (RF) beacon or tag, or any other scannable electronic device. Based on that scanned visual indicator or electronic device, either according to data embedded in the visual indicator or electronic device, data linked to the visual indicator or electronic device, or data looked up based on the visual indicator or electronic device, the application obtains information about the smart home device.

The application communicates the information about the smart home device to the computing device to provision the smart home device to the ecosystem managed by the computing device without those smart home devices being in communication with the computing device. When the smart home device is subsequently brought into the ecosystem and activated, it has already been provisioned to the ecosystem and the computing device manages at least some communication or functionality of the smart home device without further provisioning.

In some examples, a smart home device is added to the ecosystem but is not at a same location as the computing device. For example, the computing device and some smart home devices may be at a first residential home. Another smart home device may be discovered at a second residential home and be added to the ecosystem managed by the computing device using the point-and-shoot or scan functionality described above. In such an example, the smart home device discovered at the second residential home may be in a different LAN than the computing device. In such an example, the computing device may delegate at least some controller functionality to the smart home device discovered at the second residential home, or to another computing device discovered in a same LAN as the smart home device discovered at the second residential home. Based on this delegated controller functionality, control may be exerted over the smart home device discovered at the second residential home as if the smart home device discovered at the second residential home were instead discovered at the first residential home in the same LAN as the computing device. In other examples, as a component of a provisioning process for provisioning the smart home device discovered at the second residential home to the ecosystem managed by the computing device, a virtual private network (VPN) may be formed between the smart device discovered at the second residential home and the computing device. This VPN may facilitate emulation of the smart home device discovered at the second residential home being in a same LAN as the computing device, enabling control by the computing device without delegating at least some controller functionality to a device at the second residential home.

As a component of the provisioning process, validity of a smart home device being provisioned may be determined. When the smart home device is determined to be valid, the provisioning may proceed. When the smart home device is determined to not be valid, the provisioning process for the smart home device may be terminated, the smart home device may be blocked from further provisioning attempts, a notification may be sent to one or more parties (e.g., such as a manufacturer of the smart home device), and/or other actions may be taken. To determine the validity of the smart home device, in at least some examples, the computing device determines (e.g., calculates) a hash of code unique to the smart home device. The code may be randomly selected, may be a particular code segment assigned by the manufacturer of the smart home device and uniquely associated to the smart home device or generic to similar smart home devices or devices of that manufacturer, may be an entirety of an operating system or code base of the smart home device, an operating kernel of the smart home device, or any other suitable code section, portion, or segment. The determined hash of the code may be compared to a known-good hash of the code. For example, the manufacturer of the smart home device, or a digital notary or other third-party code authentication or signing entity, may provide the known-good hash of the code. The known-good hash of the code represents a hash of the code as the code should be, such as without impermissible or potentially malicious altering, such as by bad actors attempting to gain access to the LAN in which the smart device is discovered. The known-good hash of the code may be stored, in some examples, in a hyperledger format to provide a trusted, immutable, repository for the known-good hash of the code such that the known-good hash of the code is also deemed immutable and trusted. The hyperledger including the known-good hash of the code may be maintained by the computing device locally on the computing device, remotely by the computing device, remotely by a manufacturer of the smart home device, remotely by a third-party code authentication or signing entity, or any other suitable location accessible by the computing device.

After a smart home device is provisioned to the ecosystem, or as a component of the provisioning process, the computing device creates a smart contract with the smart home device that has been, or is being, provisioned. The smart contract, in at least some examples, governs and controls actions that the computing device will permit, allow, or take on behalf of, or related to, the smart home device with which the smart contract is formed. More generally, the smart contract may be, or establish, a set of rules by which the computing device controls the smart home device. The smart contract may define what actions (e.g., data transmission, etc.) the smart home device may take without the action being controlled by the computing device (e.g., such as data funneling through the computing device), what actions the computing device will block or prevent the smart home device from taking, changes that the smart home device should make to its default functionality (e.g., ceasing to perform audio recordings, etc.), or any other suitable changes to communication or operation of the smart home device imposed by the computing device.

After the computing device establishes the smart contract with the smart home device, the computing device may add the smart home device to a hyperledger managed by the computing device to define the ecosystem managed by the computing device. The smart home device may be added to the hyperledger using any suitable information or identifier that is unique to the smart home device. In at least some examples, the identifier of the smart home device used to add the smart home device to the hyperledger may be data suitable for proving to a manufacturer of the smart home device, or an independent third-party, that the computing device is controlling or managing the smart home device at the election of the user of the smart home device. In at least some examples, the hyperledger may be stored locally by the computing device and replicated to a near-cloud data store of another network, such as a communication provider's network with which the computing device communicates. The near cloud data is stored, in some examples, in a 5G network slice rather than a far-cloud data store.

After a smart home device is provisioned to the ecosystem, or as a component of the provisioning process, the computing device may generate a digital identity for the smart home device. The digital identity may be considered a digital twin of the smart home device, representing digitally the components of the smart home device at the time of provisioning. In at least some examples, the digital identity is stored in a database by the computing device and, in some examples, replicated to a near-cloud data store of another network, such as a communication provider's network with which the computing device communicates. In other examples, the digital identity is stored in a hyperledger by the computing device and, in some examples, replicated to a near-cloud data store of another network, such as a communication provider's network with which the computing device communicates. The hyperledger may be the hyperledger managed by the computing device to define the ecosystem managed by the computing device or a separate hyperledger. Determining and storing the digital identity that represents a digital twin of the components of the smart home device at the time of provisioning enables subsequent comparison of actual components of the smart home device to the digital twin to determine whether state changes have been made to the components of the smart home device, such as by the smart home device, by the computing system, or by third-party actors, whether those changes are malicious or legitimate and permissible.

In at least some examples, smart home devices interact with, or communicate with, backend servers such as application servers, via a service capability exposure function (SCEF) or network exposure function (NEF). Conventionally, the SCEF/NEF concept provides for one-to-one mapping between an application programming interface and a network node or endpoint (e.g., the smart home devices). However, the smart home devices in the ecosystem managed by the computing device may appear to a network as being only a single network endpoint while in reality being many network endpoints. Therefore, in at least some examples the computing device operates as an adaptation mechanism to map SCEF/NEF-based communication received from a network to the various smart home devices in the ecosystem managed by the computing device, or vice versa. In at least some examples, one or more APIs of the computing device, and which are associated with SCEF/NEF, may be created or modified to facilitate such operation. Further, one or more APIs of the network, and which are associated with SCEF/NEF, may be created or modified to facilitate such operation. It at least some examples, SCEF/NEF may enable the computing system to perform Non-Internet Protocol (IP) data delivery (NIDD) that bypasses an IP stack and transfers data at the control plane, where the data is considered unstructured from the Evolved Packet System (EPS) standpoint. SCEF/NEF may also enable the computing system to monitor a state of the smart home devices, perform application-specific action triggering, including communication with a Service Capability Server (SCS), and perform various coverage restriction controls.

In some examples, based at least in part on the hyperledger managed by the computing device to define the ecosystem managed by the computing device, certain accesses may be licensed to third-parties. In some examples, these third-parties may be manufacturers of a smart home device included in the ecosystem. In other examples, the third-parties may be service providers related in some manner to operations of a smart home device included in the ecosystem. In at least some examples, the hyperledger managed by the computing device to define the ecosystem may provide to these third parties using an immutable record (e.g., such as a block chain), that the computing device is managing and has access to the smart home devices within the ecosystem.

In at least some examples, creation of the hyperledger managed by the computing device to define the ecosystem managed by the computing device is a technical solution to solve a particular technical problem. Particularly, to facilitate licensing of access to the smart home device included in the ecosystem, the computing device may be required by some prospective licensees to prove technical control or management over the smart device. Such proof, in a convincing or immutable manner, may be challenging to provide because it would lack trustworthiness. The hyperledger managed by the computing device to define the ecosystem managed by the computing device provides a specific technical solution that at least partially addresses this challenge, as further discussed elsewhere herein.

Turning now to FIG. 1, a block diagram of an illustrative system 100 is described. In at least one example, the system 100 includes a smart home device 102, a smart home device 104, a smart home device 106, a computing device 108, a server 110, a server 112, a network 114, a gateway 116, and a network 118. In at least some examples, the smart home device 102, the smart home device 104, the smart home device 106, and the computing device 108 are discovered in a first location such as a house, an office building, etc. and are communicatively coupled together, through wireless and/or wired couplings, via the network 114. The network 114 is, in some examples, communicatively coupled to the network 118 via the gateway 116. The server 110 is, in some examples, associated with one or more of the smart home device 102, the smart home device 104, and/or the smart home device 106 and is communicatively coupled to the network 114 via the network 118. The server 112 is, in some examples, associated with the computing device 108 and is communicatively coupled to the computing device 108 via the network 114, gateway 116, and network 118.

At least some implementations of the computing device 108 function as a security device, at least partially securing operation of the smart home device 102, the smart home device 104, and/or the smart home device 106. For example, after one of the smart home device 102, the smart home device 104, or the smart home device 106 is registered or provisioned with the computing device 108, or the server 112, communication to that one of the smart home device 102, the smart home device 104, or the smart home device 106 passing between the network 114 and the network 118 passes through the computing device 108. In this way, the smart device functions as a gatekeeper or arbiter of the data communication. In at least some examples, data communication among the smart home device 102, the smart home device 104, and/or the smart home device 106 within the network 114 also passes through the computing device 108. In such examples, the computing device 108 is the gate keeper or arbiter of both wide area network data communication (e.g., data communication between networks 114 and 118) and local area network data communication (e.g., data communication within the network 114) for the one or more of the smart home device 102, the smart home device 104, and/or the smart home device 106 that have been registered with the computing device 108 or the server 112.

At least some implementations of the computing device 108 implement an artificial intelligence overlay that operates as an electronic assistant. In some examples, the computing device 108 is a purpose-built device. In other examples, the computing device 108 is implemented as an executable on any device having suitable processing capacity, such as a desktop computer, a server computer, a laptop computer, processor in an automobile or other transportation vehicle, a television, a phone, a wearable device, an IoT device, etc. By implementing the artificial intelligence overlay on one of the above computing devices, such computing device becomes a smart device.

The smart home devices 102, 104, and 106 are any devices having smart, or IoT, functionality, as discussed above. For example, various implementations of the smart home device 102, smart home device 104, and/or smart home device 106 include a smart light switch, a smart television, a smart audio system, a smart thermostat device or other climate control device, smart refrigerator, a smart coffee maker or other consumer device, etc. The network 114 is, in some examples, a local area network. For example, in some implementations the network 114 is a home network provided by one or more access points and operating according to conventional wireless technologies such as via a Bluetooth® interface or an IEEE 802.11 compliant wireless interface. The network 118 is, in some examples, a wide area network. For example, the network 118 is a network or a communications service provider and is communicatively coupled to the gateway 116 via a wired or wireless distribution network. For example, the network 118 may be communicatively coupled to the gateway 116 via wired cables such as copper-based cables or fiber-optic cables. Alternatively, the network 118 may be communicatively coupled to the gateway 116 via wireless protocol(s) implemented via radio transceiver cards that promote radio communications using protocols such as code division multiple access (CDMA), global system for mobile communications (GSM), long-term evolution (LTE), Fifth Generation (5G), and/or other air interface protocol(s).

The gateway 116 is any device suitable for facilitating communication between the network 114 and the network 118. Accordingly, in some examples, the gateway 116 is a router. While the gateway 116 is illustrated as having a hardwired connection to the network 118, in some examples such a connection does not exist. Instead, in such examples the gateway 116 is communicatively coupled to the network 118 via a Node B (NB) 146. The NB 146 may be an enhanced NB (eNB) used in LTE communications, a gigabit NB (gNB) used in 5G communications or 5G New Radio communications, or any other access node according to any suitable radio access technology to communicatively couple the gateway 116, wirelessly, to the network 118. In such examples, the gateway 116 may be a mobile hotspot that communicates with the network 118 via the NB 146 and is coupled to the network 114. In yet other examples, the gateway 116 also includes wireless router functionality such that the gateway 116 generates or creates the network 114. Further, in at least some examples, and although illustrated separately in FIG. 1, the computing device 108 and the gateway 116 are co-located in a same device. For example, the gateway 116 may be a mobile hotspot that enables a device, communicatively coupled wirelessly or via a wired connection to the gateway 116, to be communicatively coupled to the NB 146 and network 118 and also has processing capability. That processing capability of the gateway 116 may implement the artificial intelligence overlay (e.g., an artificial intelligence software application) that operates as the electronic assistant and/or the data arbiter, as discussed elsewhere herein.

For the sake of ease of discussion, the smart home device 102 will be discussed herein as a representative device. However, the teachings of this disclosure are also applicable to other smart home devices such as the smart home device 104, the smart home device 106, or other unshown smart home devices. Said more generally, at least some aspects of the present disclosure provide for provisioning and/or licensing by the computing device 108 with respect to one or more of the smart home devices 102, 104 and/or 106.

To begin, the computing device 108 is provisioned to the network 118 and/or the server 112, for example, by executing code on the computing device 108. The code, in at least some examples, enables the computing device 108 to discover one or more of the smart home devices 102, 104, 106, as discussed above. In at least some examples, as a component of provisioning the computing device 108, an operating kernel or other code portion is checked to determine trustworthiness of the computing device 108. For example, a hash of at least some code of the computing device 108 may be verified by a digital notary or other trusted third-party code signing authority to verify that the computing device 108 has not been compromised by malicious code or actors.

After discovering at least some of the smart home devices 102, 104, 106, the computing device 108 attempts to provision the discovered smart home devices to an ecosystem managed by the computing device 108. To begin the provisioning, the computing device 108 may query a user, such as via an application operating on a user equipment 120, to determine which of the discovered smart devices the user wishes to be provisioned to the ecosystem. For the purposes of this description it is assumed that the smart home device 102 is designated for provisioning to the ecosystem. However, in other examples other smart home devices in place of, or in addition to, the smart home device 102 may be designated for provisioning to the ecosystem.

Based on user input received responsive to the query, the computing device 108 searches a database for instructions for provisioning the smart home devices designated by the user input for provisioning to the ecosystem. The database may be a hyperledger that includes microcode instructions corresponding to an identity or other indicator (e.g., a UPC, a barcode, a model number, a serial number, a media access control (MAC) address, or any other suitable identifier) of the smart home device 102. The computing device obtains the microcode instructions and continues the provisioning process of the smart home device to the ecosystem based on the microcode instructions.

Based on the microcode instructions, which may designate or include requirements, limitations, and/or other instructions or directions for the computing device 108 interacting with the smart home device 102, the computing device 108 establishes a smart contract with the smart home device 102. In at least some examples, the smart contract defines the rules by which the computing device 108 will control or manage communications and other functions of the smart home device 102, including actions that the smart home device 102 may, or may not, be permitted to take. The smart contract may also define rules for which actions the computing device 108 will, or may, automatically or selectively (e.g., optionally) take on behalf of the smart home device 102 and outside of control of the smart home device 102.

In at least some examples, details of the smart contract and/or an identification of the smart home device 102 may be written by the computing device 102 into a hyperledger or other database managed by the computing device 108 and which defines, describes, or otherwise reflects the ecosystem managed by the computing device 108. In at least some examples, the computing device 108 replicates this hyperledger or other database to a near-cloud storage location, for example, to facilitate burst of speed operations. The hyperledger or other database may be an immutable description of the ecosystem that proves management of the smart home device 102 by the computing device 108 to third-parties, such as a manufacturer of the smart home device 102 or a service provider, such as associated with a function of the smart home device 102. In this way, the hyperledger or other database may be used to provide control of the smart home device 102 to parties or entities seeking to license enhanced access to the smart home device 102 via the computing device 108.

In at least some examples, the computing device 108 further creates a digital twin of the smart home device 102. The digital twin is a digital representation of hardware, electrical, computing, and/or other characteristics of the smart home device 102 at a time of provisioning of the smart home device 102 to the ecosystem. The digital twin, in at least some examples, provides an exact or near exact digital replica of potential and actual physical assets, process, and systems of the smart home device 102. The digital twin may provide or include both elements of the smart home device 102 and information about how the smart home device 102 operates. In some examples the digital twin of the smart home device 102 and the smart home device 102 are connected via regular updates to the digital twin based on real-time, or near real-time, sensor data captured from the smart home device 102. In some examples, a digital twin may be used to replicate functionality, settings, or other details from a device within the ecosystem managed by the computing device 108 to a similar device located elsewhere, such as a rental vehicle, a temporary residence (e.g., hotel room, rental home, etc.), or other location. Additionally, a digital twin of a device that is malfunctioning may be used to virtually recreate the device to identify the malfunction, identify a repair for the malfunction, and/or repair the malfunction.

The digital twin may be stored, in some examples, in the hyperledger or other database described above that defines, describes, or otherwise reflects the ecosystem managed by the computing device 108. In other examples, the digital twin may be stored by the computing device 108 in another hyperledger or database, which may also be replicated to a near-cloud storage location. Creation and storage of the digital twin, in at least some examples, enables subsequent comparison by the computing device 108 of real-time, or near real-time, characteristics of the smart home device 102 to corresponding characteristics of the digital twin to determine whether a state of those characteristics has changed at the smart home device 102 since provisioning.

After the smart home device 102 is provisioned to the ecosystem managed by the computing device 108, the computing device 108 operates as an arbiter for WAN communication of the smart home device 102. In some other examples, the computing device 108 further operates as an arbiter for LAN communication of the smart home device 102. The computing device 108 performs such arbitration, in some examples, based on the smart contract created with the smart home device 102 during the provisioning process. For example, based on the provisioning process, the smart contract, and/or the microcode instructions associated with the smart home device 102, the smart home device 102 is programmed (such as via an API) or controlled to only communicate WAN data through the computing device 108 and/or communicate WAN and LAN data through the computing device 108. Similarly, the server 110 may be programmed (such as via an API) or controlled to only communicate with the smart home device 102 through the computing device 108.

While the above provisioning process defines the computing device 108 discovering the smart home device 102, in other examples a user may identify the smart home device 102 to the computing device. For example, as discussed above a user may use a point-and-shoot or scan functionality of the application operating on the user equipment 120 to identify the smart home device 102, or another smart home device, to the computing device 108 for provisioning to the ecosystem. The point-and-shoot or scan functionality may capture an identifier, code, or data element of a smart home device and provide that identifier to the computing device 108. In some examples, the computing device 108 provisions the identified smart home device to the ecosystem without the identified smart home device being in communication with the computing device 108 at the time of provisioning. In other examples, the computing device 108 may perform a portion of the provisioning of the identified smart home device to the ecosystem before the identified smart home device is in communication with the computing device 108 and a remainder of the provisioning after the identified smart home device is in communication with the computing device 108. In such examples, the computing device 108 may determine at least some characteristics of the identified smart home device for use in the provisioning based on a look-up table, hyperledger, or other database searched by the computing device 108 according to the identifier of the identified smart home device to determine the at least some characteristics of the identified smart home device.

As discussed above, in at least some examples, the computing device 108 receives a request from the server 110, associated with a third-party, for enhanced access to the smart device 102 and/or for the computing device 108 to perform actions on behalf of the third-party related to the smart home device 102. In such an example, the computing device 108 may license certain access to the smart home device 102, or actions of the computing device 108, to the third-party via the server 110. In some implementations, the computing device 108 may verify to the third-party that the computing device 108 has control over and/or manages the smart device 102 based at least partially on the hyperledger that defines, describes, or otherwise reflects the ecosystem managed by the computing device 108.

Figure 2:
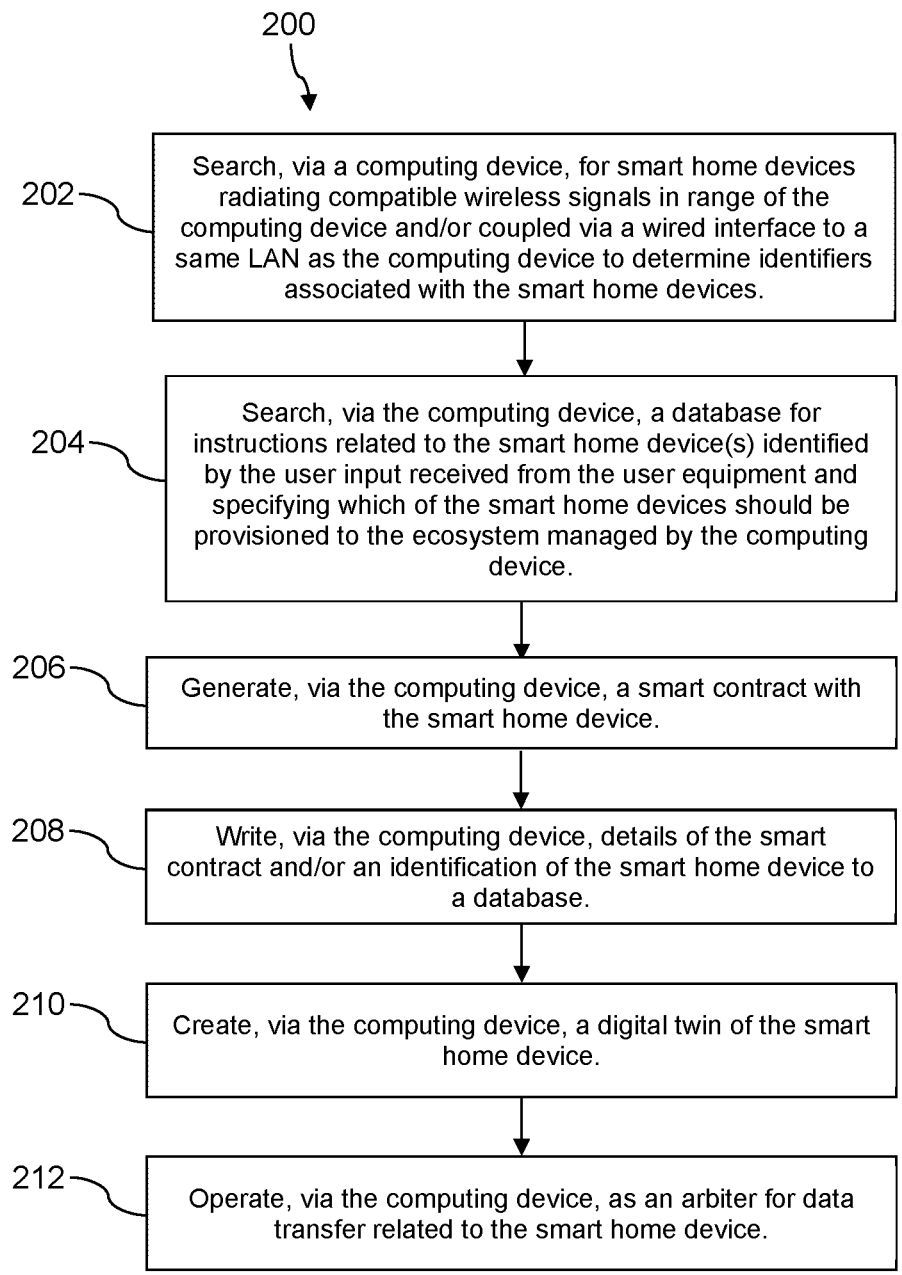
FIG. 2 is a flow chart of an illustrative method according to an embodiment of the disclosure.

FIG. 2 illustrates a flowchart of a method 200 for provisioning a device to a managed ecosystem in a network. The method 200 is implemented, in some examples, by a computing device such as the computing device 108 of the system 100, described above with respect to FIG. 1. The computing device implements the method 200, in some examples, to provision a smart home device to an ecosystem managed by the computing device such that the smart home device becomes at least partially controlled and/or managed by the computing device following the provisioning.

At operation 202, the computing device searches for smart home devices radiating compatible wireless signals in range of the computing device and/or coupled via a wired interface to a same LAN as the computing device to determine identifiers associated with the smart home devices. Alternatively, in at least some examples, the computing device receives an identifier associated with a smart home device from a user equipment, such as the user equipment 120 of FIG. 1, that is in communication with the computing device, rather than discovering the smart home device in the LAN. Smart home devices discovered by the computing device may be filtered based on the identifiers associated with the smart home devices and according to a database or other lookup table that lists smart home devices that are compatible with the computing device for control or management by the computing device. Those smart home devices that are compatible with the computing device may be presented to a user. The user may provide input specifying which of the smart home devices should be provisioned to the ecosystem managed by the computing device. In at least some examples, the presentation to the user and entry of the user input is performed via the user equipment that is in communication with the computing device.

At operation 204, the computing device searches a database for instructions related to the smart home device(s) identified by the user input received from the user equipment and specifying which of the smart home devices should be provisioned to the ecosystem managed by the computing device. The database is, in some examples, a hyperledger that stores microcode instructions in a trusted and/or immutable manner. When found in the database, the computing device may obtain the instructions.

At operation 206, the computing device generates a smart contract with the smart home device. The smart contract defines the rules by which the computing device will control or manage communications and other functions of the smart home device, including actions that the smart home device may, or may not, be permitted to take. The smart contract may also define rules for which actions the computing device will, or may, automatically or selectively (e.g., optionally) take on behalf of the smart home device and outside of control of the smart home device.

At operation 208, the computing device writes details of the smart contract and/or an identification of the smart home device to a database. In at least some examples, the database is a hyperledger such that it is deemed immutable and includes a provable implication of trustworthiness and/or validity in the contents of the dataset. The database may define, describe, or otherwise reflect the ecosystem managed by the computing device. The computing device may replicate the database, in at least some implementations, to near cloud storage of a core network with which the computing device communicates.

At operation 210, the computing device creates a digital twin of the smart home device. The digital twin is a digital representation of hardware and/or other characteristics of the smart home device at a time of provisioning of the smart home device 102 to the ecosystem. The digital twin may be stored, in some examples, in the hyperledger or other database written to at operation 208 and which defines, describes, or otherwise reflects the ecosystem managed by the computing device. In other examples, the digital twin may be stored by the computing device in another hyperledger or database, which may also be replicated to a near-cloud storage location. Creation and storage of the digital twin, in at least some examples, enables subsequent comparison by the computing device of real-time, or near real-time, characteristics of the smart home device to corresponding characteristics of the digital twin to determine whether a state of those characteristics has changed at the smart home device since provisioning.

At operation 212, the computing device operates as an arbiter for data transfer related to the smart home device. The data may be inbound to the smart home device or outbound from the smart home device. The computing device may control data transfer to or from the smart home device automatically, without user input, based on the smart contract created with the smart home device. In other examples, the computing device may control the data transfer based on allowed and/or blocked lists that define permissible and/or impermissible communication content, sources, and/or destinations and which may be updated based on user input or feedback.

Figure 3:
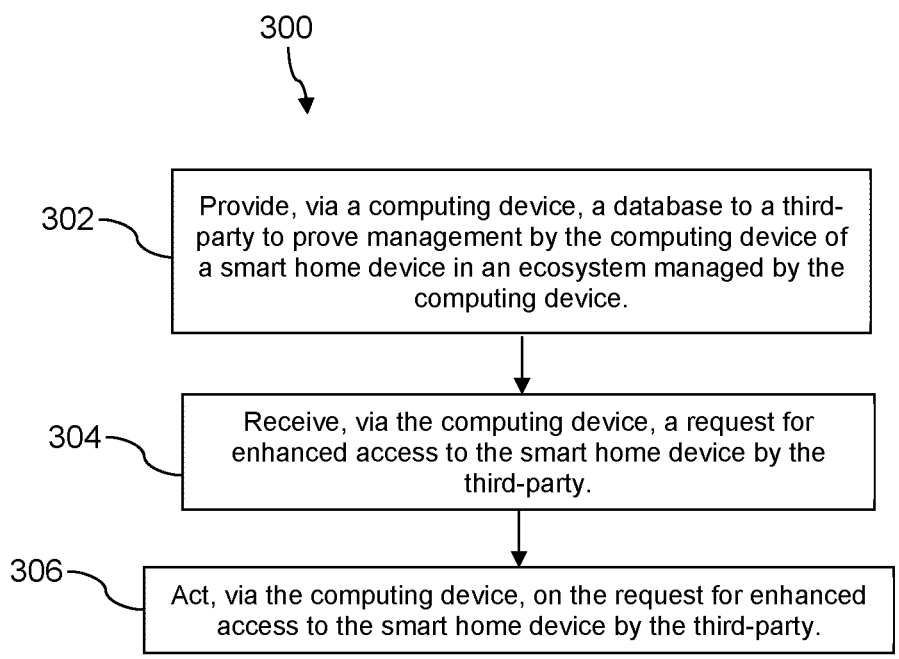
FIG. 3 is a flow chart of an illustrative method according to an embodiment of the disclosure.

FIG. 3 illustrates a flowchart of a method 300 for providing licensed access to a device in a managed ecosystem in a network. The method 300 is implemented, in some examples, by a computing device such as the computing device 108 of the system 100, described above with respect to FIG. 1. The computing device implements the method 300, in some examples, to provide enhanced or otherwise licensed access to managed devices in an ecosystem managed by the computing device. In at least some examples, the method 300 is complementary to the method 200 such that both methods are implemented together by the same computing device.

At operation 302, the computing device provides a database to a third-party to prove management by the computing device of a smart home device in an ecosystem managed by the computing device. In at least some examples, the database is a hyperledger that defines, describes, or otherwise reflects the ecosystem managed by the computing device, such as created above at operation 208 of the method 200 of FIG. 2. In at least some examples, the smart home device is represented in the database in an immutable manner verifiable by the third-party, or another third-party verification entity such that the database proves to the third-party that the smart home device is controlled by the computing device.

At operation 304, the computing device receives a request for enhanced access to the smart home device by the third-party. In some examples, the enhanced access includes the computing device performing certain actions on behalf of the third-party with respect to the smart home device. In other examples, the enhanced access includes the computing device permitting the smart home device to send otherwise blocked communications to the third-party, or the computing device routing certain communications of the smart home device to certain destinations specified by the third-party. In yet other examples, the enhanced access includes the computing device permitting the smart home device to receive otherwise blocked communications from the third-party.

At operation 306, the computing device acts on the request for enhanced access to the smart home device by the third-party. In some examples, acting on the request includes licensing or permitting the requested enhanced access. In other examples, acting on the request includes blocking or denying the enhanced access. In various examples, the computing device modifies and/or creates entries in one or more databases responsive to acting on the request. In at least some examples, the computing device acts on the request automatically, or based on an artificial intelligence or machine learning processing. For example, the computing device may act on the request based on previously provided user preferences, contents of the smart contract with the smart home device, default preferences of the computing device that the user has not elected to modify, etc. In other examples, the computing device acts on the request based on user input provided in response to the computing device querying a user to determine a preference of the user related to the request for enhanced access.

Figure 4:
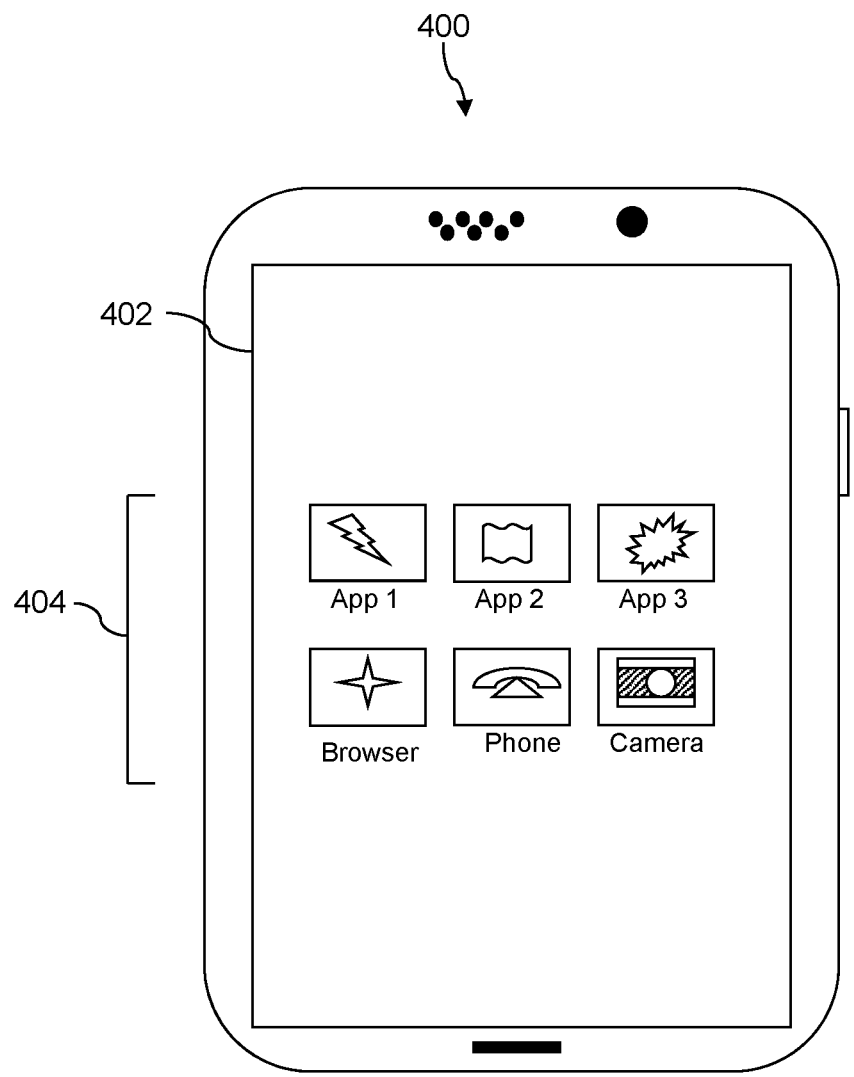
FIG. 4 is an exemplary user equipment according to an embodiment of the disclosure.

FIG. 4 depicts the user equipment (UE) 400, which is operable for implementing aspects of the present disclosure, but the present disclosure should not be limited to these implementations. In at least some examples, the UE 400 may be suitable for implementation as the user equipment 120 described above with respect to FIG. 1. Though illustrated as a mobile phone, the UE 400 may take various forms including a wireless handset, a pager, a personal digital assistant (PDA), a gaming device, or a media player. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. In at least some examples, one or more of the applications may interact communicatively with the computing device 108 of FIG. 1 to provide data to the computing device 108 for provisioning a smart home device to an ecosystem managed by the computing device 108. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 5:
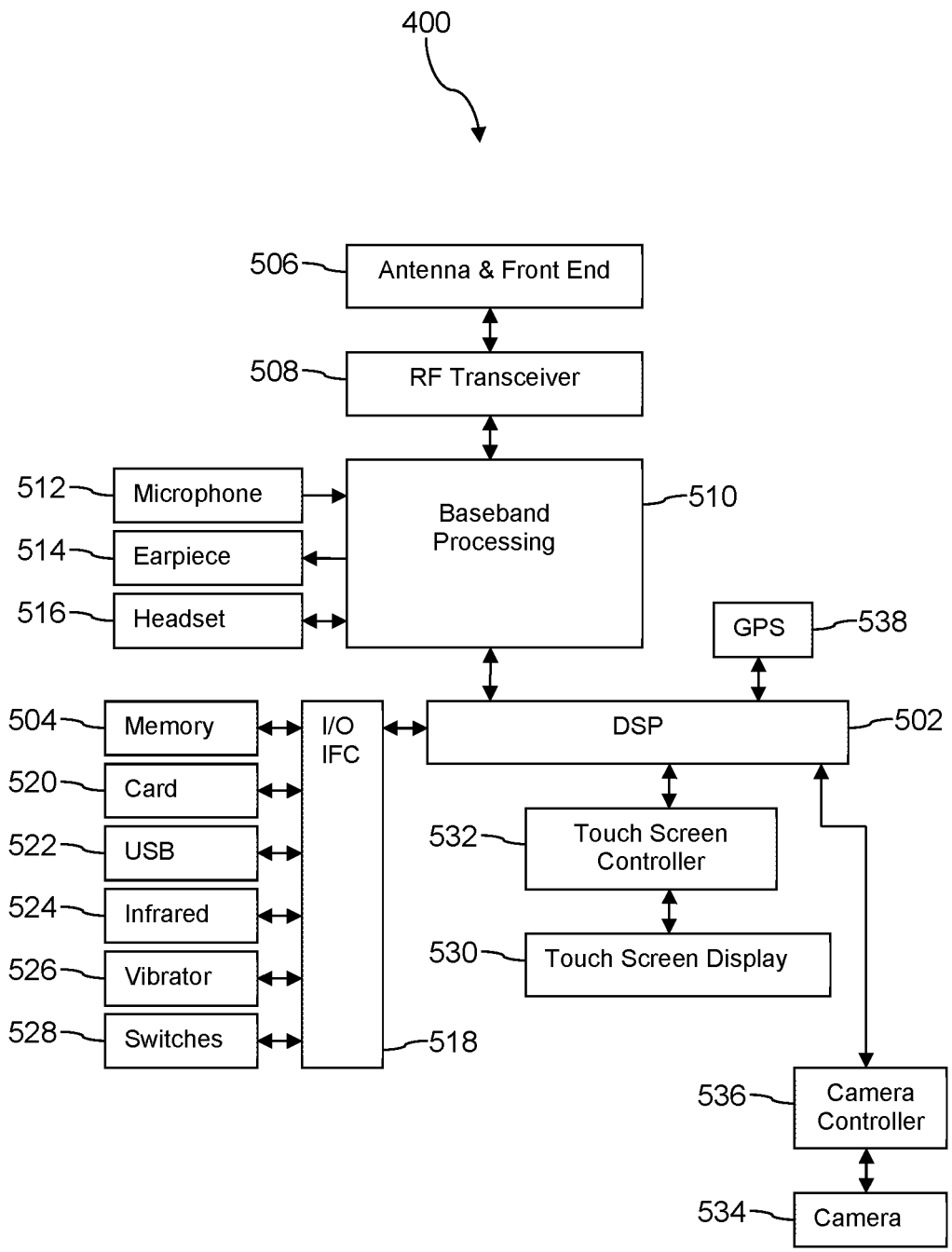
FIG. 5 is a block diagram of the exemplary user equipment according to an embodiment of the disclosure.

FIG. 5 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include one or more antenna and front end unit 506, a one or more radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen display 530, a touch screen controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations.

In an embodiment, one or more of the radio transceivers is a cellular radio transceiver. A cellular radio transceiver promotes establishing a wireless communication link with a cell site according to one or more of a 5G, a long term evolution (LTE), a code division multiple access (CDMA), a global system for mobile communications (GSM) wireless communication protocol. In an embodiment, one of the radio transceivers 508 may comprise a near field communication (NFC) transceiver. The NFC transceiver may be used to complete payment transactions with point-of-sale terminals or other communications exchanges or scan a NFC tag to obtain data associated with the NFC tag. In an embodiment, each of the different radio transceivers 508 may be coupled to its own separate antenna. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 6A:
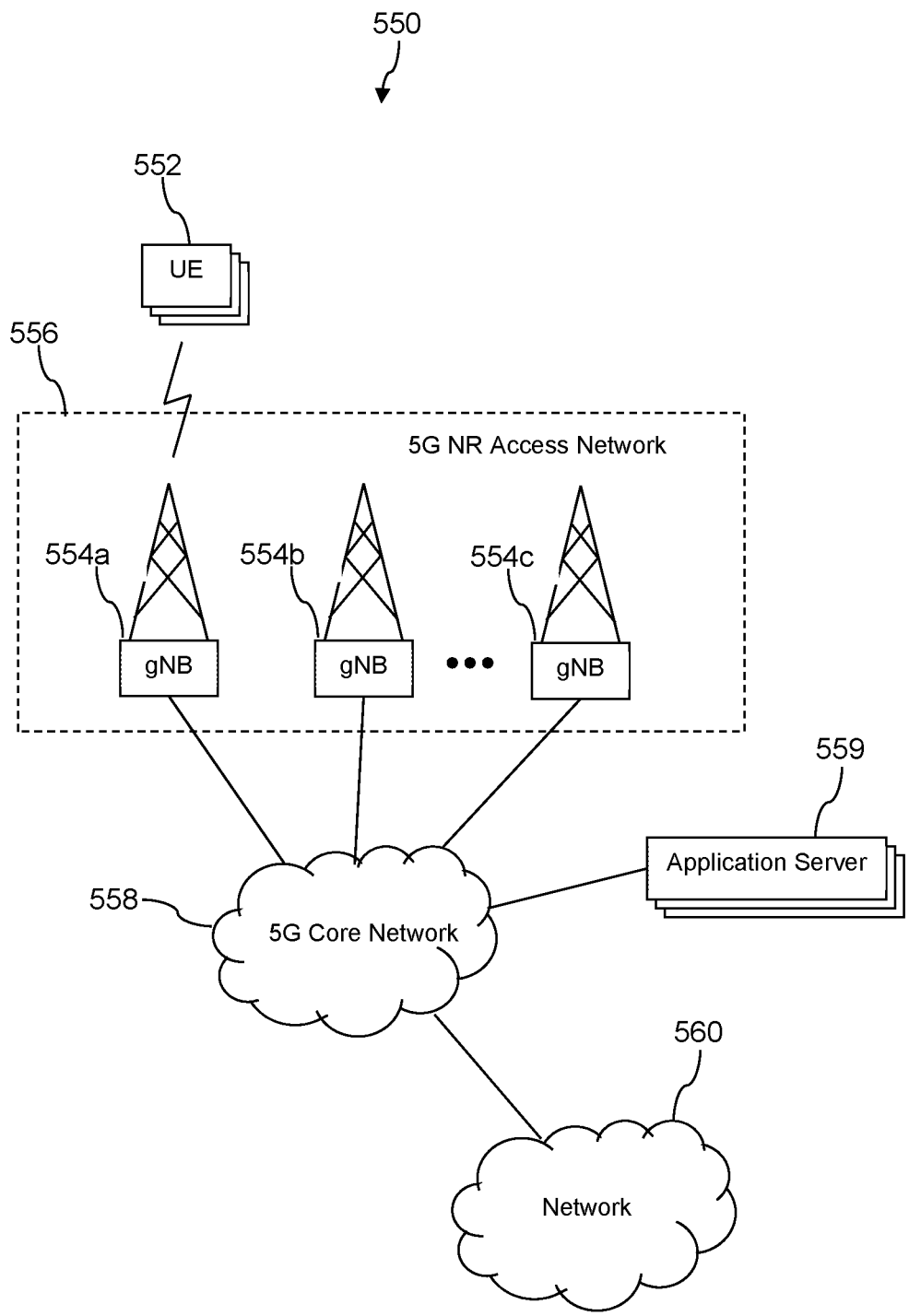
FIG. 6A is an exemplary communication system according to an embodiment of the disclosure.

Turning now to FIG. 6A, an exemplary communication system 550 is described. Typically the communication system 550 includes a number of access nodes 554 that are configured to provide coverage in which UEs 552 such as cell phones, tablet computers, machine-type-communication devices, tracking devices, embedded wireless modules, and/or other wirelessly equipped communication devices (whether or not user operated), can operate. The access nodes 554 may be said to establish an access network 556. The access network 556 may be referred to as a radio access network (RAN) in some contexts. In a 5G technology generation an access node 554 may be referred to as a gigabit Node B (gNB). In 4G technology (e.g., long term evolution (LTE) technology) an access node 554 may be referred to as an enhanced Node B (eNB). In 3G technology (e.g., code division multiple access (CDMA) and global system for mobile communication (GSM)) an access node 554 may be referred to as a base transceiver station (BTS) combined with a basic station controller (BSC). In some contexts, the access node 554 may be referred to as a cell site or a cell tower. In some implementations, a picocell may provide some of the functionality of an access node 554, albeit with a constrained coverage area. Each of these different embodiments of an access node 554 may be considered to provide roughly similar functions in the different technology generations.

In an embodiment, the access network 556 comprises a first access node 554a, a second access node 554b, and a third access node 554c. It is understood that the access network 556 may include any number of access nodes 554. Further, each access node 554 could be coupled with a core network 558 that provides connectivity with various application servers 559 and/or a network 560. In an embodiment, at least some of the application servers 559 may be discovered close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554 and could thereby communicate via the access node 554 with various application servers and other entities.

The communication system 550 could operate in accordance with a particular radio access technology (RAT), with communications from an access node 554 to UEs 552 defining a downlink or forward link and communications from the UEs 552 to the access node 554 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"— such as Long Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (I). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554 and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and sub-carrier, and the subcarrier of each resource element could be modulated to carry data. Further, in each subframe or other transmission time interval (TTI), the resource elements on the downlink and uplink could be grouped to define physical resource blocks (PRBs) that the access node could discover as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554 to served UEs 552. And on the uplink, certain resource elements could be reserved to carry random access signaling from UEs 552 to the access node 554, and other resource elements could be reserved to carry other control signaling such as PRB-scheduling requests and acknowledgement signaling from UEs 552 to the access node 554.

The access node 554, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 6B:
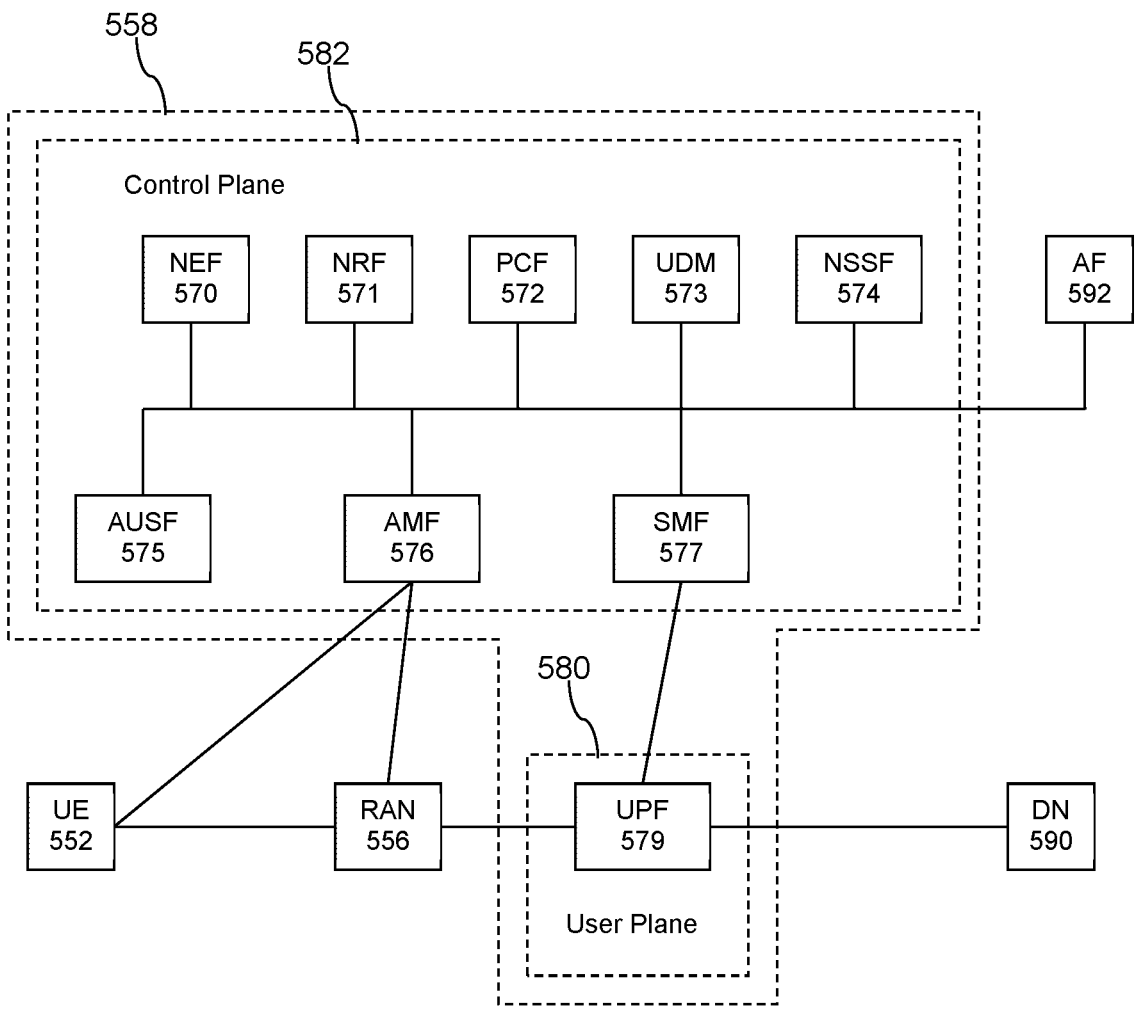
FIG. 6B is an exemplary core network according to an embodiment of the disclosure.

Turning now to FIG. 6B, further details of the core network 558 are described. In an embodiment, the core network 558 is a 5G core network. 5G core network technology is based on a service-based architecture paradigm. Rather than constructing the 5G core network as a series of special purpose communication nodes (e.g., an HSS node, a MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 575, an access and mobility management function (AMF) 576, a session management function (SMF) 577, a network exposure function (NEF) 570, a network repository function (NRF) 571, a policy control function (PCF) 572, a unified data management (UDM) 573, a network slice selection function (NSSF) 574, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

The UPF 579 delivers packet processing and links the UE 552, via the access node 556, to a data network 590 (e.g., the network 560 illustrated in FIG. 6A). The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 575 facilitates security processes.

The NEF 570 securely exposes the services and capabilities provided by network functions. The NRF 571 supports service registration by network functions and discovery of network functions by other network functions. The PCF 572 supports policy control decisions and flow based charging control. The UDM 573 manages network user data and can be paired with a user data repository (UDR) that stores user data such as customer profile information, customer authentication number, and encryption keys for the information. An application function 592, which may be discovered outside of the core network 558, exposes the application layer for interacting with the core network 558. In an embodiment, the application function 592 may be execute on an application server 559 discovered geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 574 can help the AMF 576 to select the network slice instance (NSI) for use with the UE 552.

Figure 7A:
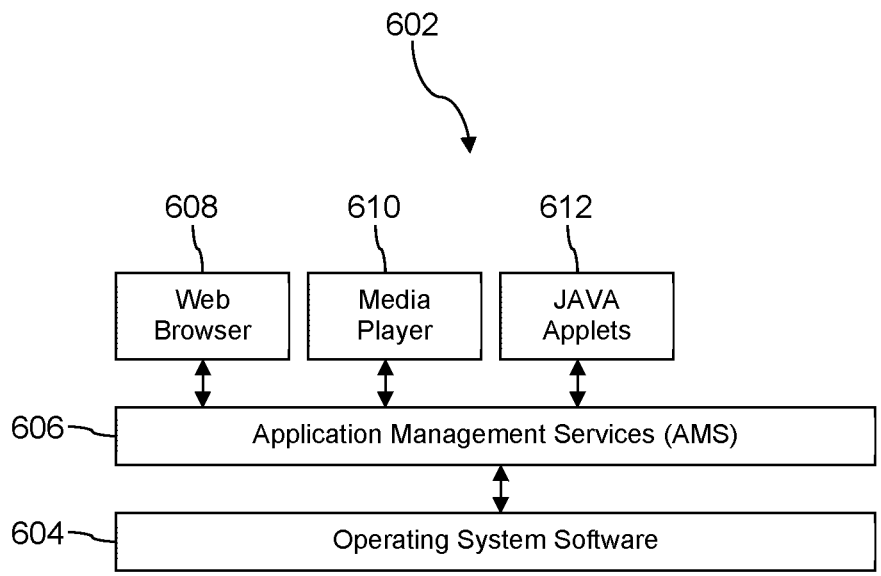
FIG. 7A is an example software environment according to an embodiment of the disclosure.

FIG. 7A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 7A are a web browser application 608, a media player application 610, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 7B:
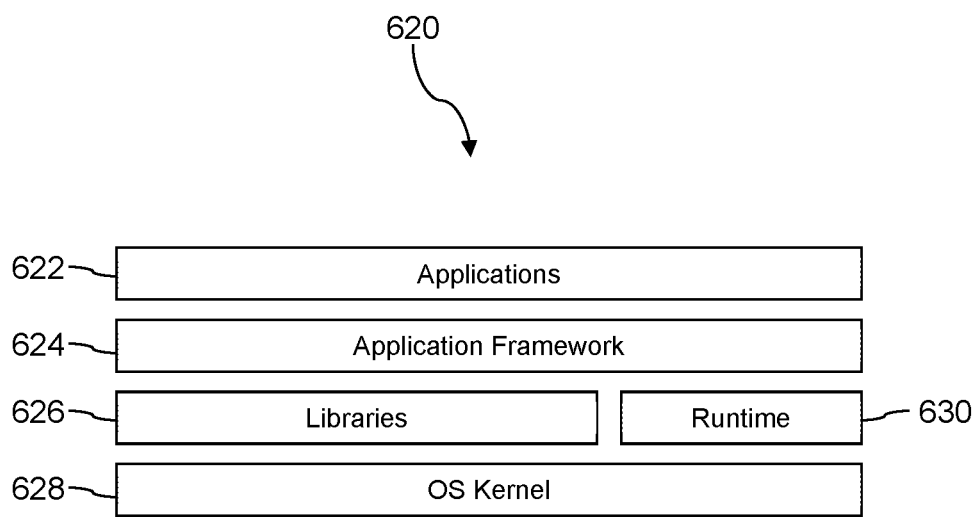
FIG. 7B is an example alternative software environment according to an embodiment of the disclosure.

FIG. 7B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 8:
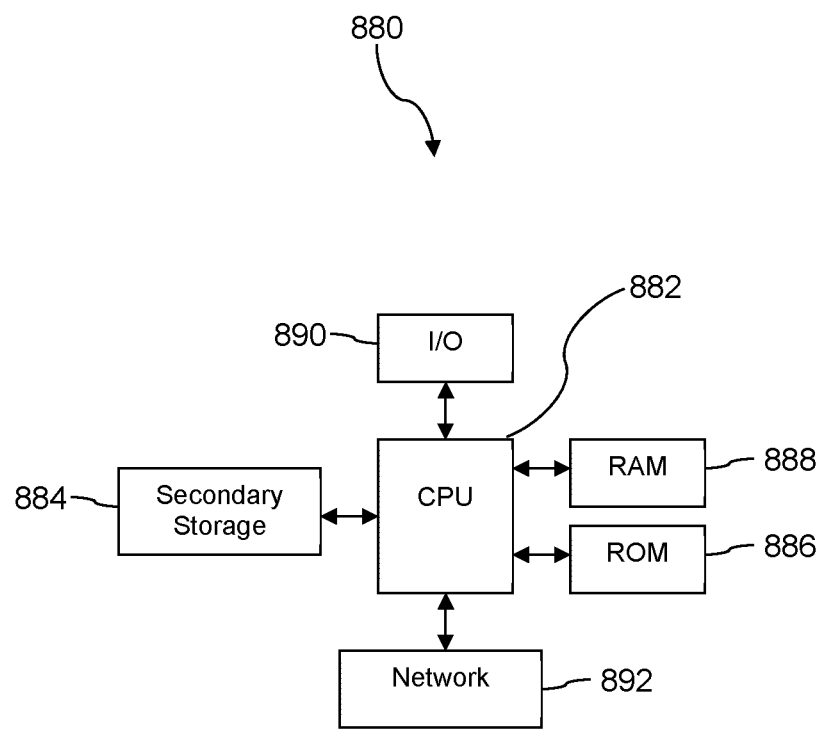
FIG. 8 is block diagram of an illustrative computer system according to an embodiment of the disclosure.

FIG. 8 illustrates a computer system 880 suitable for implementing one or more embodiments disclosed herein. The computer system 880 includes a processor 882 (which may be referred to as a central processor unit or CPU) that is in communication with memory devices including secondary storage 884, read only memory (ROM) 886, random access memory (RAM) 888, input/output (I/O) devices 890, and network connectivity devices 892. The processor 882 may be implemented as one or more CPU chips.

It is understood that by programming and/or loading executable instructions onto the computer system 880, at least one of the CPU 882, the RAM 888, and the ROM 886 are changed, transforming the computer system 880 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 880 is turned on or booted, the CPU 882 may execute a computer program or application. For example, the CPU 882 may execute software or firmware stored in the ROM 886 or stored in the RAM 888. In some cases, on boot and/or when the application is initiated, the CPU 882 may copy the application or portions of the application from the secondary storage 884 to the RAM 888 or to memory space within the CPU 882 itself, and the CPU 882 may then execute instructions that the application is comprised of. In some cases, the CPU 882 may copy the application or portions of the application from memory accessed via the network connectivity devices 892 or via the I/O devices 890 to the RAM 888 or to memory space within the CPU 882, and the CPU 882 may then execute instructions that the application is comprised of. During execution, an application may load instructions into the CPU 882, for example load some of the instructions of the application into a cache of the CPU 882. In some contexts, an application that is executed may be said to configure the CPU 882 to do something, e.g., to configure the CPU 882 to perform the function or functions promoted by the subject application. When the CPU 882 is configured in this way by the application, the CPU 882 becomes a specific purpose computer or a specific purpose machine.

The secondary storage 884 is typically comprised of one or more disk drives or tape drives and is used for non-volatile storage of data and as an over-flow data storage device if RAM 888 is not large enough to hold all working data. Secondary storage 884 may be used to store programs which are loaded into RAM 888 when such programs are selected for execution. The ROM 886 is used to store instructions and perhaps data which are read during program execution. ROM 886 is a non-volatile memory device which typically has a small memory capacity relative to the larger memory capacity of secondary storage 884. The RAM 888 is used to store volatile data and perhaps to store instructions. Access to both ROM 886 and RAM 888 is typically faster than to secondary storage 884. The secondary storage 884, the RAM 888, and/or the ROM 886 may be referred to in some contexts as computer readable storage media and/or non-transitory computer readable media.

I/O devices 890 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 892 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 892 may provide wired communication links and/or wireless communication links (e.g., a first network connectivity device 892 may provide a wired communication link and a second network connectivity device 892 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 892 may enable the processor 882 to communicate with the Internet or one or more intranets. With such a network connection, it is contemplated that the processor 882 might receive information from the network, or might output information to the network in the course of performing the above-described method steps. Such information, which is often represented as a sequence of instructions to be executed using processor 882, may be received from and outputted to the network, for example, in the form of a computer data signal embodied in a carrier wave.

Such information, which may include data or instructions to be executed using processor 882 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 882 executes instructions, codes, computer programs, scripts which it accesses from hard disk, floppy disk, optical disk (these various disk based systems may all be considered secondary storage 884), flash drive, ROM 886, RAM 888, or the network connectivity devices 892. While only one processor 882 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 884, for example, hard drives, floppy disks, optical disks, and/or other device, the ROM 886, and/or the RAM 888 may be referred to in some contexts as non-transitory instructions and/or non-transitory information.

In an embodiment, the computer system 880 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 880 to provide the functionality of a number of servers that is not directly bound to the number of computers in the computer system 880. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 880, at least portions of the contents of the computer program product to the secondary storage 884, to the ROM 886, to the RAM 888, and/or to other non-volatile memory and volatile memory of the computer system 880. The processor 882 may process the executable instructions and/or data structures in part by directly accessing the computer program product, for example by reading from a CD-ROM disk inserted into a disk drive peripheral of the computer system 880. Alternatively, the processor 882 may process the executable instructions and/or data structures by remotely accessing the computer program product, for example by downloading the executable instructions and/or data structures from a remote server through the network connectivity devices 892. The computer program product may comprise instructions that promote the loading and/or copying of data, data structures, files, and/or executable instructions to the secondary storage 884, to the ROM 886, to the RAM 888, and/or to other non-volatile memory and volatile memory of the computer system 880.

In some contexts, the secondary storage 884, the ROM 886, and the RAM 888 may be referred to as a non-transitory computer readable medium or a computer readable storage media. A dynamic RAM embodiment of the RAM 888, likewise, may be referred to as a non-transitory computer readable medium in that while the dynamic RAM receives electrical power and is operated in accordance with its design, for example during a period of time during which the computer system 880 is turned on and operational, the dynamic RAM stores information that is written to it. Similarly, the processor 882 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method implemented by a computing device in a network, comprising:
    searching a local area network for smart home devices to determine an identifier associated with a smart home device;
    searching a database for instructions related to the smart home device based on the determined identifier of the smart home device, wherein the database comprises a hyperledger that includes microcode instructions related to the smart home device;
    generating a smart contract between the computing device and the smart home device based at least partially on the instructions related to the smart home device, wherein the smart contract defines rules by which the computing device controls communications of the smart home device including allowed actions and disallowed actions of the smart home device;
    writing the identifier associated with the smart home device to a second database, wherein the second database is a second hyperledger;
    generating a digital twin of the smart home device; and
    automatically arbitrating communication of the smart home device based on the smart contract.

2. The method of claim 1, further comprising writing details of the smart contract to the second database.

3. The method of claim 1, wherein the second database defines an ecosystem of devices including the smart home device that is managed by the computing device according to the instructions related to the smart home device.

4. The method of claim 1, further comprising writing the digital twin to the second database, wherein the digital twin is a digital representation of electrical characteristics of the smart home device.

5. The method of claim 1, further comprising:
    providing access to the second data base to a third-party to prove that the smart home device is in an ecosystem of devices that is managed by the computing device;
    receiving a request from the third-party for enhanced access to the smart device; and
    acting on the request from the third-party for enhanced access to the smart device, wherein acting on the request comprises granting or denying the request.

6. The method of claim 1, further comprising, prior to searching the database for instructions related to the smart home device, presenting a user with a list of the smart home devices found in the local area network and receiving from the user, a selection of the smart home device for addition to an ecosystem of devices that is managed by the computing device.

7. The method of claim 1, wherein the digital twin is generated after the smart home device is provisioned to an ecosystem of devices that is managed by the computing device.

8. The method of claim 1, wherein the digital twin represents digitally components of the smart home device at a time of provisioning.

9. The method of claim 1, wherein the digital twin is used to compare to actual components of the smart home device to determine whether state changes have been made to the components of the smart home device.

10. A system comprising:
    a computing device in a network configured to:
        search a local area network for smart home devices to determine an identifier associated with a smart home device;
        search a database for instructions related to the smart home device based on the determined identifier of the smart home device, wherein the database comprises a hyperledger that includes microcode instructions related to the smart home device;
        generate a smart contract with the smart home device based at least partially on the instructions related to the smart home device, wherein the smart contract defines rules by which the computing device controls communications of the smart home device including allowed actions and disallowed actions of the smart home device;

write the identifier associated with the smart home device to a second database, wherein the second database is a second hyperledger;

generate a digital twin of the smart home device; and automatically arbitrate communication of the smart home device based on the smart contract.

11. The system of claim 10, wherein the computer device is further configured to write details of the smart contract to the second database.

12. The system of claim 10, wherein the second database defines an ecosystem of devices including the smart home device that is managed by the computing device according to the instructions related to the smart home device.

13. The system of claim 10, wherein the computing device is further configured to write the digital twin to the second database, wherein the digital twin is a digital representation of electrical characteristics of the smart home device.

14. The system of claim 10, wherein the computing device is further configured to:

provide access to the second data base to a third-party to prove that the smart home device is in an ecosystem of devices that is managed by the computing device, receive a request from the third-party for enhanced access to the smart device, and act on the request from the third-party for enhanced access to the smart device, wherein acting on the request comprises granting or denying the request.

15. The system of claim 10, wherein the computing device is further configured to, prior to searching the database for instructions related to the smart home device, present a user with a list of the smart home devices found in the local area network and receive from the user a selection of the smart home device for addition to an ecosystem of devices that is managed by the computing device.

16. The system of claim 10, wherein the digital twin is generated after the smart home device is provisioned to an ecosystem of devices that is managed by the computing device.

17. The system of claim 10, wherein the digital twin represents digitally components of the smart home device at a time of provisioning.

18. The system of claim 17, wherein the digital twin is used to compare to actual components of the smart home device to determine whether state changes have been made to the components of the smart home device.

* * * * *